Dec. 1, 1959     L. E. HOYER     2,915,347
JOURNAL BEARING LUBRICATORS
Filed Dec. 16, 1954
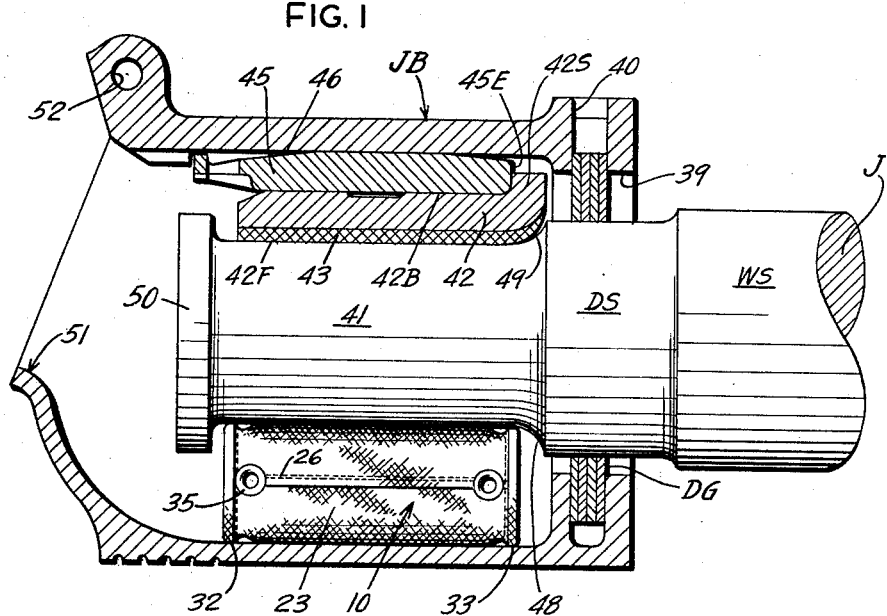
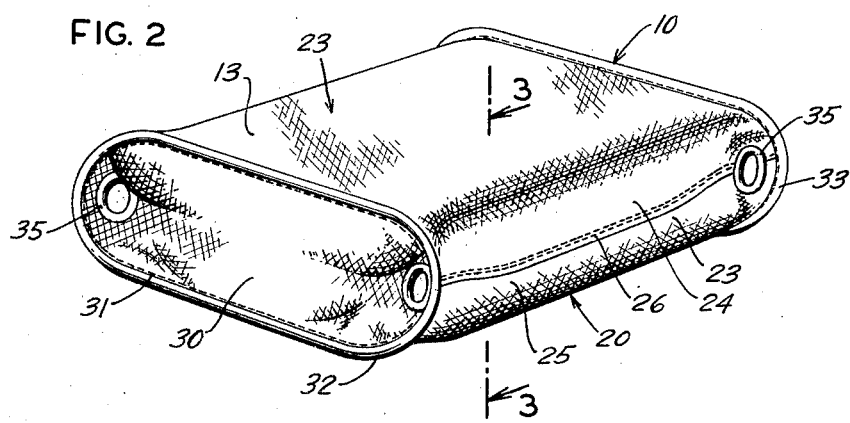
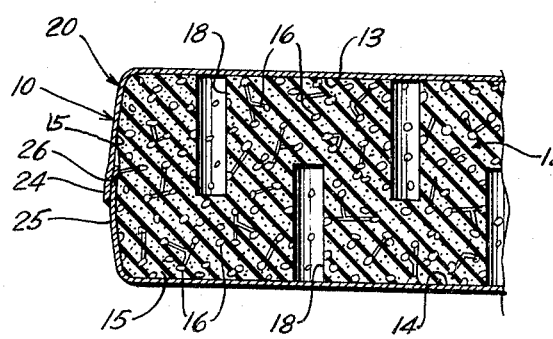
*INVENTOR.*
LLEWELLYN E. HOYER
BY
*Wallace and Cannon*
ATTORNEYS

United States Patent Office 2,915,347
Patented Dec. 1, 1959

2,915,347

JOURNAL BEARING LUBRICATORS

Llewellyn E. Hoyer, Wyckoff, N.J., assignor to American Brake Shoe Company, Wilmington, Del., a corporation of Delaware Application December 16, 1954, Serial No. 475,701

4 Claims. (Cl. 308—243)

This invention relates to a lubricator for a railway journal bearing.

The railway industry had at one time depended primarily upon oil soaked waste packing in the bottom of the journal box to lubricate the journal bearing, such being packed into the cavity between the journal and the bottom of the journal box so that rotation of the journal served to relay lubricant to the bearing. However, increased speeds of rolling stock during recent years have given rise to the so-called hot box problem caused by loose strands of waste packing being trapped between the journal and the bearing. These fugitive strands are soon wiped dry and ignited by friction, causing the box to burst into flame. In view of this, the industry has been seeking to determine a suitable substitute for waste packing, and the lubricator of the present invention is constructed of an absorbent pad of self-sustaining composition material which obviates the foregoing problem.

Journal bearing lubricators in the form of an absorbent composition pad or the like are not new in themselves, but where these have been employed it is sometimes difficult to withdraw the pad from beneath the journal where such is necessitated. Therefore, one of the primary objects of the present invention is to enable a journal bearing lubricator comprising an absorbent pad to be readily removed from the journal box when and as required.

As pad lubricators for journal bearings have been heretofore constructed, these have been of such configuration, that there is but one way in which the pad may be operatively inserted in the journal box. In view of this, a further object of the present invention is to enable a pad lubricator for a journal bearing to be reversible so as to be mountable in the journal box without regard to which end or side is inserted first.

In most instances where a composition pad has been used as a journal bearing lubricator, the face thereof engaged by the rotating journal becomes glazed such as to impair transmission of lubricant through the pad, and the prevention of this is a further object of the present invention. An additional object of the present invention is to enlarge the lubricating properties of composition lubricators in a novel manner.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a sectional view taken axially through a conventional journal box showing the lubricator of the present invention in an operative position;

Fig. 2 is a perspective view of the lubricator of the present invention; and

Fig. 3 is a partial sectional view of the lubricator taken substantially on line 3—3 of Fig. 2.

In accordance with the present invention, there is afforded a lubricator 10 for a journal bearing, dimensioned to be reversible end for end or face for face when mounted in the journal box of a railway car between the journal and the bottom of the box. The lubricator 10 includes a porous resilient pad 12 of composition material which in the present instance consists of oil resistant sponge rubber such as porous neoprene which may be either of the open or closed cell type. To enable the lubricator 10 to be reversibly mounted in the journal box, the pad 12 includes upper and lower opposed faces 13 and 14, respectively, that are substantially square in lateral dimension so that at least these faces of the pad are symmetrical. Preferably, the pad 12 includes end and side walls as 15 which are also of equal dimension, although it will be appreciated from the description to follow that the faces 13 and 14 of the porous composition pad could be made arcuate or tapered to afford a continuous edge about the pad that would lie in a plane medially between the upper and lower faces 13 and 14, being in the nature of a pillow.

The pad 12 is highly porous as afforded by the numerous open cells 16 that are distributed throughout the body thereof, and it is these cells that enable lubricant to be absorbed by the pad. To facilitate and expedite passage of lubricant through the pad in the way which will be described below, the pad 12 is cored during the molding operation, or otherwise provided with randomly arranged vertical passages 18 of enlarged diameter which open at either face of the pad 12. The passages 18 are, however, discontinuous as shown in Fig. 3 so as to extend but partially through the body of the pad, and the reason for this will be pointed out below.

A frequent problem encountered with composition pad lubricators as heretofore constructed has been the glazing of the face disposed in the journal box to engage the journal of the railway. This impedes effective transmission of lubricant through the pad to the journal. The possibility of such glazing is eliminated in the present instance by completely enclosing the pad 12 in a sheath 20 of non-glazing porous woven material such as cotton wicking of the kind from which oil burner wicks are ordinarily prepared. Such woven material resists glazing and being highly absorbent readily transmits lubricant. Thus, a web 23 of cotton wicking material having a width slightly wider than the faces of the pad is folded about one of the side walls as 15 of the pad and the ends 24 and 25 of this web are lapped at the medial portion of the opposite side wall of the pad and are stitched together as at 26. A pair of panels 30 of cotton wicking material are afforded for the end walls of the pad, and the continuous edges of these panels are stitched as at 31 to the free marginal edge portions of the web 23 where these edges extend beyond the end and side walls of the pad 12. Stitching of the panels 30 to the web 23 in this manner leaves oval ridges or ribs 32 and 33 which extend somewhat beyond the end and side walls of the pad as best shown in Fig. 2, so that at the four corners of the lubricator 10 there are loose portions of wicking material and these portions are utilized in a way which will now be described.

At the four corners of the pad where there are loose portions of the fabric sheath or cover 20, hook-receiving elements in the form of relatively large brass eyelets or grommets 35 are fastened in a conventional manner to crimp together the bight portions of the panel 30 and the web 23 at such corners. When this is done, it is found that the four corners of the fabric sheath 20 about the pad 12 project in an outboard relation at substantially 45° angles in position to be readily engaged by a hook, and it is this relation which facilitates removal of the lubricator from the journal box when required as will now be described.

In Fig. 1 there is shown a journal box JB of the kind conventionally employed for railway rolling stock. Extended through an opening 39 at one end of the journal box is the journal J of the car. The journal J includes a portion WS of enlarged diameter on which the wheel of the car (not shown) is to be disposed. Forwardly of the wheel seat WS is a portion of reduced diameter DS serving as a seat for a dust guard DG disposed in a slot 40 that is provided therefor at the end of the journal box which is to be disposed adjacent the car wheel. As is well known in the art, the dust guard DG includes an opening in the medial portion thereof that fits tightly about the dust guard seat on the journal so as to close off the corresponding end of the journal box.

Forwardly of the dust guard seat DS is a further reduced portion 41 on the journal, and it is this portion of the journal which is supported in an antifriction relation by a bearing 42. The bearing 42 is segmental and includes a lower arcuate face 42F having a radius of curvature corresponding to the portion 41 of the journal. This lower face of the bearing is lined with Babbitt metal 43, and the journal rotates thereon.

The bearing 42 is of cast bronze or the like and includes a flat back 42B engaged by the flat lower face of a wedge 45. The upper face 46 of the wedge 45 is arcuate in an axial direction so as to engage the top wall of the journal box when in operative position to hold the bearing 42 tightly on the portion 41 of the journal. When properly positioned, the rear edge 45E of the wedge 45 engages a shoulder 42S at the rear of the bearing 42.

The end of the portion 41 of the journal that is adjacent the dust guard seat DS is filleted at 48, and the corresponding end 49 of the bearing 42 is likewise filleted so as to substantially mate with the filleted surface 48. At the opposite end, the portion 41 of the journal is formed with an annular flange 50 of larger diameter than the portion 41 so that the journal J may have relative movement in an axial direction between the flange 50 and the aforementioned filleted surfaces.

The lubricator 10 is adapted to be inserted in to the journal box in the cavity between the journal and the bottom of the box as shown in Fig. 1 with one face of the wicking web 23 engaged by the journal. In this condition, the lubricator 10 is under slight compression or compaction in a radial direction, and when thus placed lubricant may be supplied to the lubricator 10 through the open end 51 of the journal box where the closure lid (not shown) for the journal box is hinged at 52.

It has been found that the lubricator 10 does not partake of any motion of the journal either in an axial or circumferential direction. Hence, when the car is in motion, the lubricator 10 occupies an operative position medially between the flanged and filleted ends of the portion 41 of the journal. As the journal rotates on the upper face of the fabric sheath 20, lubricant absorbed in the cells 16 of the pad 12 is continuously relayed by capillarity through the portion of the porous sheath engaged by the journal, and the journal is then effective to wipe the Babbitt lining of the bearing 42 with a film of lubricant. Where there is motion of the journal in a vertical direction, as often occurs, the pad lubricator 10 undergoes compression of a substantial magnitude between the faces 13 and 14 thereof. Such compression of the pad 12 by the journal creates pressure in those passages 18 that open at the face of the pad disposed toward the bottom of the box JB. Lubricant at the bottom of the box is forced upwardly through the dead ends of these passages 18 opening at the bottom of the box so that in effect individual fountains of lubricant spray through the upper face of the pad 12 and the sheath 20 at the portion thereof beyond the dead ends of the passages 18, and such assures that the face of the lubricator engaging the journal is at all times supplied with lubricant. Were it not for the passages 18 being extended but part way through the body of the pad, pressures of appreciable magnitude would not occur within those passages 18 that open at the bottom of the box JB where there is lubricant, and moreover it will be seen from Fig. 3 that the passages 18 opening at either face of the pad 12 are effective regardless of which face of the pad is at the bottom of the journal box. It will be further observed that the dead ends of the passages 18 are not extended appreciably beyond the horizontal center section of the body of the porous pad. This assures that the pad is not unduly limp and also assures that the porous pad is appreciably springy to assure the desired establishment of pressure in the passages 18. Additionally, since the cover is extended about the opposed faces of the porous pad, the cover serves as a filter preventing contamination of the passages 18 which might interfere with the effective building up of pressure in the passages 18.

Inasmuch as the lubricator 10 includes a hook-receiving elements such as the eyelets 35 at the four corners thereof, removal of the pad from the journal box may be readily accomplished by engaging with a hook whichever of the eyelets 35 beneath the flange 50 is most accessible from the open end of the journal box. When so hooked, the pad as viewed in Fig. 2 may be pivoted either in a counterclockwise or clockwise direction at the bottom of the box so as to turn the hooked corner inwardly toward the axis of the journal, and as such turning action occurs the diametrical axis of the lubricator becomes aligned with the axis of the journal under which circumstance the hooked corner of the pad gradually passes under and is freed by the flange 50. Accordingly, the lubricator 10 may be withdrawn hooked corner first from beneath the flange 50 which is a more facile operation than in those instances where it has been necessary with journal bearing lubricator pads as heretofore constructed to grasp a handle or the like attached to the end wall of the pad behind the flange 50 of the journal. Mention was made that the pad 12 may be of the open or closed cell type, and where the latter type is used, I have found that by capillarily piercing the face of the pad to tap the dead ends of the passages 18 such is effective to provide fountains of lubricant where the lubricator is under compression with lubricant in the passages 18 as described above.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A lubricator adapted to be inserted in the journal box of a railway car or the like in the cavity between the journal and the bottom of the box comprising a body of porous sponge oil-resistant rubber having at least opposed faces of symmetrical dimension and enlarged passages therein that open at each face and extend but partially through the pad to have dead ends which terminate within the body of the pad, a cover of woven wicking material enclosing completely the body of the pad, and eyelets of rigid material fastened to said wicking cover enabling the lubricator when disposed in the journal box to be hooked at an eyelet and then turned about the bottom of the box to facilitate withdrawal of the lubricator therefrom, said enlarged passages in the pad enabling pressure to be created on lubricant retained therein when the pad is compressed and thereby forced through porous openings in the pad adjacent said dead ends.

2. A lubricator adapted to be reversibly, on end or face, inserted in the journal box of a railway car or the like in the cavity between the journal and the bottom of the box so as to engage the journal and relay lubricant thereto by capillarity and comprising, a porous pad of oil resistant material adapted to absorb and pass lubricant by capillarity, said pad including upper and lower faces of symmetrical dimension and end and side walls of symmetrical dimension enabling the pad to be reversibly inserted in the journal box as aforesaid, a wicking cover extended about all exposed surfaces of said pad so as to engage the journal from either face of the pad consistent with the reversible nature of the lubricator, hook-receiving metal eyelets fastened to said cover at both ends of the lubricator to enable the lubricator to be hooked at either end and adjusted within the journal box or withdrawn therefrom by a hook or the like, and enlarged passages extending inwardly of the pad from both faces thereof and in a staggered relation consistent with the reversible nature of the lubricator, said enlarged passages having dead ends terminating within the body of the pad so as to create pressure on lubricant trapped in those of the passages having the open ends thereof disposed away from said journal upon compression of the pad thereupon causing lubricant to emit as a spray upwardly through the pad at porous areas thereof above the dead ends of the passages having lubricant trapped therein as aforesaid.

3. A lubricator adapted to be inserted in the journal box of a railway car or the like in the cavity between the journal and the bottom of the box and comprising a self-sustaining pad of porous oil-resistant oil-absorbent material having side and end walls and upper and lower faces, enlarged unobstructed passages formed in said pad to open at the lower face of the pad which is to lie adjacent the bottom of the journal box, said enlarged passages extending but part way through the pad to have dead ends terminating within the body of the pad well below the upper face of the pad and the portions of the pad overlying said dead ends consisting only of the porous material comprising said pad, said dead ends being located substantially near the horizontal center section of said pad, whereby oil supplied to the bottom of said journal box and trapped in said enlarged passages will be placed under pressure upon vertical compression of the pad and caused to emit through the porous areas of the pad overlying said dead ends and on to the upper face of the pad, a cover of wicking material extended about said pad to cover the open ends of said enlarged passages and to cover the side and end walls of said pad and to cover the upper face of said pad, said cover at selected areas adjacent the ends thereof being provided with eyelets of rigid material fastened directly thereto.

4. A lubricator according to claim 3 wherein said passages having dead ends are formed in both faces of the pad in a random and staggered relation.

References Cited in the file of this patent
UNITED STATES PATENTS

| | | |
|---|---|---|
| 91,000 | Devlan | June 8, 1869 |
| 1,374,960 | Shipman | Apr. 19, 1921 |
| 2,049,225 | Ripley | July 28, 1936 |
| 2,079,734 | Ditmore | May 11, 1937 |
| 2,138,971 | Keeler et al. | Dec. 6, 1938 |
| 2,141,897 | Behrmann | Dec. 27, 1938 |
| 2,150,935 | Miller | Mar. 21, 1939 |
| 2,291,483 | Miller | July 28, 1942 |
| 2,657,958 | Tagliaferri et al. | Nov. 3, 1953 |
| 2,713,524 | Hagy | July 19, 1955 |
| 2,762,665 | Harkenrider | Sept. 11, 1956 |

OTHER REFERENCES

Perfect Journal Lubrication, June 1, 1937, Publication of Lubrication Products Co.